United States Patent [19]
Sato

[11] Patent Number: 4,893,988
[45] Date of Patent: Jan. 16, 1990

[54] SYSTEM FOR DAMPING LEAD-LAG MOTION OF ROTOR BLADES OF HELICOPTER

[75] Inventor: Tetsuro Sato, Tokyo, Japan

[73] Assignee: Fuji Jukogyo Kabushiki Kaisha, Tokyo, Japan

[21] Appl. No.: 269,365

[22] Filed: Nov. 10, 1988

[30] Foreign Application Priority Data

Nov. 10, 1987 [JP] Japan .................................. 62-283742

[51] Int. Cl.$^4$ .............................................. B64C 27/38
[52] U.S. Cl. ................................. 416/140; 416/134 A
[58] Field of Search .......... 416/134 A, 140 A, 138 A, 416/141

[56] References Cited

U.S. PATENT DOCUMENTS

| 4,087,203 | 5/1978 | Ferris | 416/141 |
| 4,093,400 | 6/1978 | Rybicki | 416/134 A X |
| 4,244,677 | 1/1981 | Noehren et al. | 416/134 A |
| 4,299,538 | 11/1981 | Ferris et al. | 416/134 A |
| 4,332,525 | 6/1982 | Cheney | 416/134 A |
| 4,381,902 | 5/1983 | Head et al. | 416/134 A |
| 4,427,340 | 1/1984 | Metzger et al. | 416/141 |
| 4,676,720 | 6/1987 | Niwa et al. | 416/134 A |
| 4,690,616 | 9/1987 | Hahn et al. | 416/134 A |
| 4,778,343 | 10/1988 | Hahn et al. | 416/134 A |

Primary Examiner—Everette A. Powell, Jr.
Attorney, Agent, or Firm—Beveridge, DeGrandi & Weilacher

[57] ABSTRACT

A helicopter rotor blade supported by a flexbeam to be rotatable about an axis of rotation, in which a pitching motion thereof is allowable, is provided with a device for changing the pitch and damping the lead-lag motion thereof. The device comprises a bushing in a through hole formed at the inboard end of the flexbeam, an elastomeric pivot loosely fitted in the bushing, elastomeric dampers of cylindrical shape mounted on the upper and lower surfaces of the flexbeam and coupled with the upper and lower ends of the elastomeric pivot by means of nuts, and torque arms extending through the bushing and the elastomeric dampers and having the central portion thereof connected to central shafts of the elastomeric pivots. Each of the torque arms has both ends outwardly projecting beyond the elastomeric dampers and secured to a pitch sleeve which encloses the flexbeam. Therefore,the relative position between the pitch sleeve and the elastomeric pivot does not change even when lead-lag motion is imparted to the rotor blade.

6 Claims, 3 Drawing Sheets

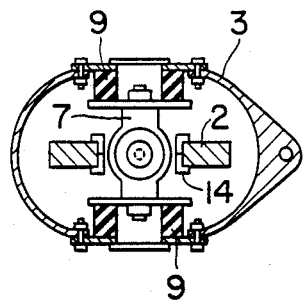
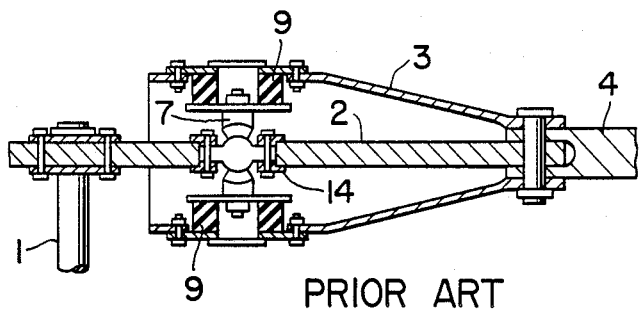
PRIOR ART
FIG. 5A
PRIOR ART
FIG. 5B
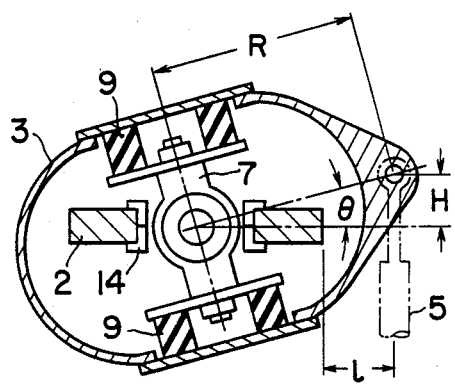
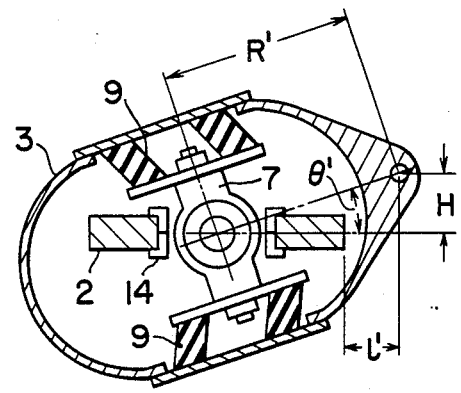
PRIOR ART
FIG. 6
PRIOR ART
FIG. 7
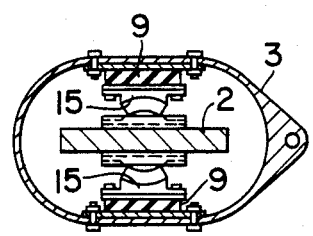
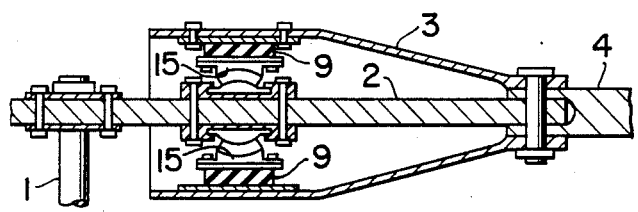
PRIOR ART
FIG. 8A
PRIOR ART
FIG. 8B

SYSTEM FOR DAMPING LEAD-LAG MOTION OF ROTOR BLADES OF HELICOPTER

BACKGROUND OF THE INVENTION

This invention relates to a system for damping the lead-lag motion of rotor blades of a helicopter.

A helicopter rotor usually has an even number of rotor blades, typically four in cruciform fashion, wherein the opposed blades are supported by flexible beams or flexbeam to be rotatable about the axis of rotation of the rotor mast. The flexbeam reacts against the centrifugal load between opposite blades and may terminate at a convenient radial position.

In the so-called soft-enplane rotor of a helicopter in which the frequency of natural oscillation in the plane of rotation of the rotor has a value less than the value of the rotational speed of the rotor, there tends to occur a type of aeromechanical instability known as a resonance on ground or resonance in air. This is a kind of self-exciting oscillation which occurs in a case where the frequency of natural oscillation $w\zeta$ in the plane of rotation of the rotor changes in accordance with the rotational speed $\Omega$ of the rotor and the value $|\omega 70/\Omega)-1|$ is in agreement with the frequency of natural oscillation of the helicopter body, and if the motion of the rotor in the plane of rotation of the rotor is insufficiently damped, there is a possibility of the helicopter body being placed in an undesirable condition.

In order to eliminate such adverse phenomenon, it has been required for a rotor blade, which is soft in the plane of rotation of the rotor, to be provided with a damping device.

U.S. Pat. No. 4,427,340 to Metzger et al, U.S. Pat. No. 4,244,677 to Noehren et al, and U.S. Pat. No. 4,087,203 to Ferris disclose damping devices for damping the lead-lag motion of a helicopter rotor. According to conventional techniques disclosed in these prior art references, however, pitch change control or regulation of the helicopter rotor must be made by a predetermination of the degree of pitch angle change on the basis of associated phenomenon of the lead-lag motion and the pitch value, which is a difficult matter of the design of the helicopter rotor, and it is also difficult to expect a sufficient stable damping function, as will be described hereinafter. In addition, a complicated structure of the helicopter rotor is required for eliminating the problems described above.

SUMMARY OF THE INVENTION

An object of this invention is to substantially eliminate the problems or drawbacks encountered in the conventional technique described above and to provide a a system for damping the lead-lag motion of rotor blades of a helicopter, capable of preventing change of the relative positional relationship between an elastomeric pivot incorporated in the system and a pitch sleeve enclosing a flexbeam of the helicopter rotor and also capable of sufficiently attaining a lead-lag motion damping function.

These and other objects can be achieved according to this invention by providing a system for damping lead-lag motion of rotor blades of a helicopter, which comprises a central mast rotated by a power source, at least two flexbeams each connected with the central mast at an inboard portion thereof to rotate about the rotational axis of the central mast and secured to one of the rotor blades at an outboard end thereof, pitch sleeve means secured at one end thereof to the rotor blade to enclose each of the flexbeams, said pitch sleeve means having a substantially elliptical cross section, pitch change means for changing the pitch of the rotor blades by moving the pitch sleeve means, and damping means for damping the lead-lag motion of the rotor blades, said system being characterized in that the damping means comprises: at least one torque arm coupled with the pitch sleeve means at upper and lower sides of the pitch sleeve means, an elastomeric pivot having at least one central shaft supported by the torque arm, said elastomeric pivot also having upper and lower extensions; and elastomeric dampers mounted on upper and lower surfaces of each of the flexbeams at one end portions thereof and fastened to the upper and lower extensions of the elastomeric pivot at the other end portions thereof, respectively, to damp the lead-lag motion of the rotor blade so as to prevent changing of relative positional relationship between the pitch sleeve means and the elastomeric pivot even when change of relative positional relationship occurs between the flexbeam and the pitch sleeve means by the operation of the pitch change means.

According to the system described above, with respect to each rotor blade of the helicopter, the elastomeric dampers and the torque arm are coupled with the flexbeam and the pitch sleeve, respectively, and the elastomeric pivot is also fastened to the elastomeric dampers and the torque arm, while the elastomeric dampers are mechanically but not directly coupled with the pitch sleeve, whereby the relative positional relationship between the elastomeric pivot and the pitch sleeve is not changed and the lead-lag motion damping function can be effectively maintained. The bushing has a function as a stopper or abutment acting so as to prevent overload on the elastomeric pivot as the same is loosely fitted in the bushing. The motion of the rotor blade can be distributed or absorbed by the elastic strain of the elastomeric pivot and dampers.

A preferred embodiment according to this invention will be described below in detail with reference to the accompanying drawings.

BRIEF DESCRIPTION OF THE DRAWINGS

In the accompanying drawings:

FIGS. 5A, 5B, 6 and 7 are sectional views of a conventional pitch change and lead-lag motion damping device corresponding to the states shown in FIGS. 2A, 2B, 3 and 4, respectively; and FIGS. 8A and 8B are views of another conventional device, corresponding to the states shown in FIGS. 2A and 2B, respectively.

DESCRIPTION OF THE PREFERRED EMBODIMENTS

Figure 1:
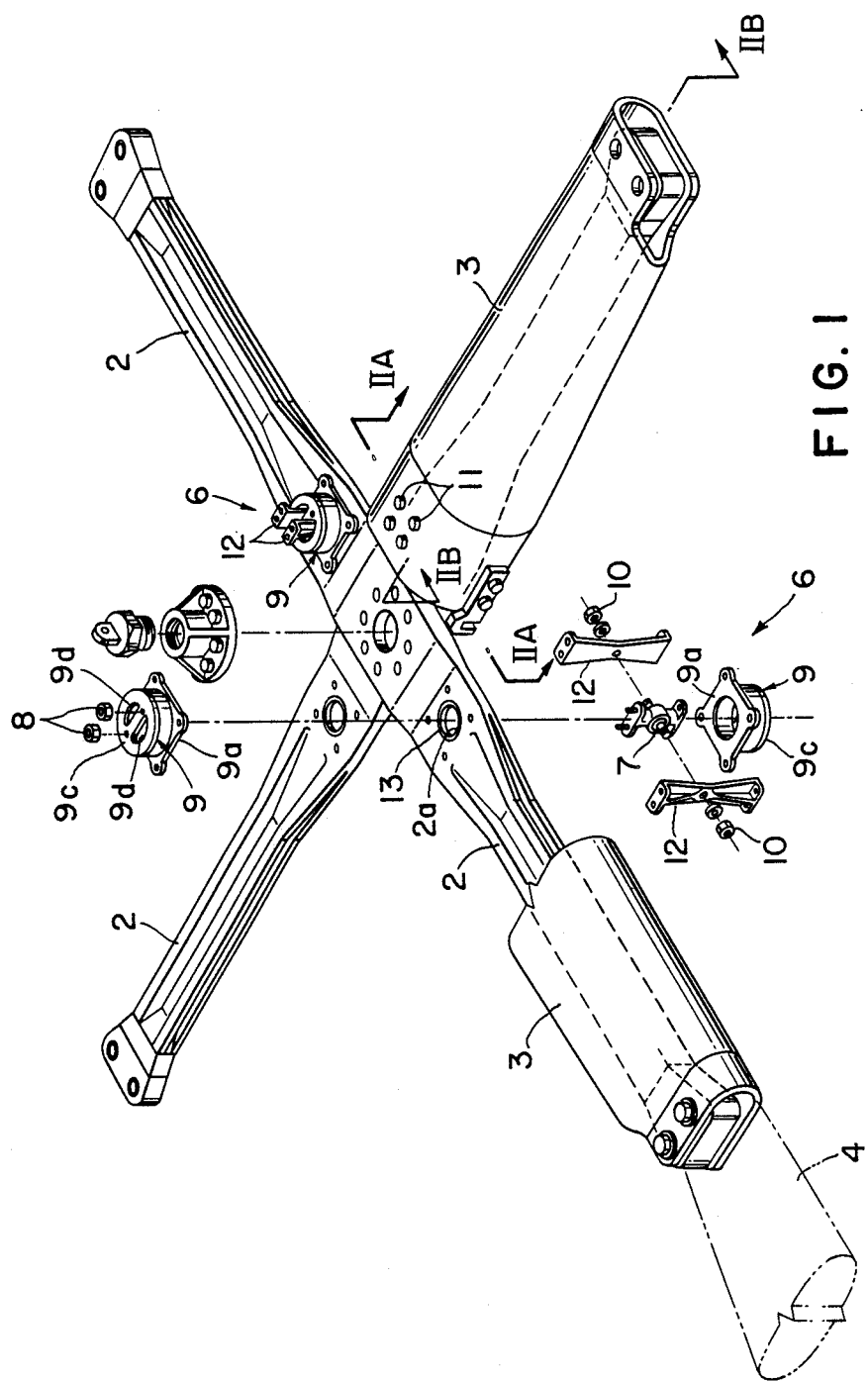
FIG. 1 is a perspective view of a disassembled helicopter rotor blade assembly provided with a pitch change and lead-lag motion damping device according to this invention.

Prior to the description of the preferred embodiment of this invention, conventional techniques and their defects or drawbacks will first be described below for a better understanding of the background of this invention.

FIGS. 5A to 7 represent a damping device of a helicopter rotor of the type disclosed in U.S. Pat. No. 4,427,340 to Metzger et al, in which an elastomeric pivot 7 is secured to a flexible beam or flexbeam 2 through fastening unit 14 and elastomeric dampers 9 are disposed between the elastomeric pivot 7 and a pitch sleeve or pitch sleeve 3 of substantially elliptical cross section.

FIGS. 8A and 8B also represents a damping device of the type disclosed in U.S. Pat. No. 4,244,677 to Noehren et al, in which elastomeric dampers 9 are disposed between the pitch sleeve 3 and the elastomeric pivot halves 15, respectively.

U.S. Pat. No. 4,087,203 to Ferris discloses an elastomeric damper of the type described above, which is disposed apart from the location of the elastomeric pivot.

In the damping device disclosed in U.S. Pat. No. 4,427,340, however, the center of rotation of the elastomeric pivot 7 is fixed with respect to the flexbeam 2, so that a rotor blade 4 anchored to the flexbeam 2 is subject to lead-lag motion and the distance between the end face of the flexbeam 2 and a pitch change link 5 changes. When the distance therebetween is changed, as shown in FIGS. 6 and 7, from a value 1 to a value 1' (lead-lag momentum $\beta = 1 - 1'$), a pitch change radius changes from R to R' and a rotor blade pitch angle changes from $\theta$ to $\theta'$, as shown, in accordance with the relative positional change between the elastomeric pivot 7 and the pitch sleeve 3. Pitch change control or regulation by predetermination of the degree of pitch angle change on the basis of the associated phenomenon of the lead-lag motion and the pitch value, i.e. pitch/-lead-lag coupling, is a matter of difficulty in design of helicopter rotors.

U.S. Pat. No. 4,244,677 aims to obviate the associated phenomenon of the lead-lag and the pitch value and teaches a device wherein the elastomeric pivot halves 15, shown in FIGS. 8A and 8B, are slidable so as to absorb the variation of the pitch change radius when the lead-lag motion occurs in the rotor blade 4. However, since the sliding direction of the elastomeric halves 15 is substantially in agreement with the direction of action of the elastomeric dampers 9, a minute or fine adjustment is required for attaining a sufficient damper effect, and hence it is difficult to expect a sufficiently stable damping function. In order to obviate this problem, it will be required to dispose the damper mechanism at a portion apart from the location of the elastomeric pivot, as disclosed U.S. Pat. No. 4,087,203, which, however, makes the structure of the helicopter rotor complex. In addition, wear tends to occur on the sliding surfaces between the elastomeric pivot halves and its support surface, so that the maintenance and control of gaps between the respective parts or elements is required, to result in troublesome periodic inspection, short life of the parts and other accompanying problems.

Moreover, the conventional mechanisms or devices disclosed in the references cited above are all not provided with mechanical stopper for restricting excessive lead-lag motion of the rotor blade, so that overload may be imparted to the flexbeam and the elastomeric dampers during the lead-lag operation of the rotor blade during the rotor diving or rotor braking.

This invention was made taking into consideration of the conventional techniques described above. FIGS. 1 to 4 show a preferred embodiment according to this invention which is applied to the vicinity of a helicopter rotor hub to which four rotor blades 4 are secured.

Figure 2A:
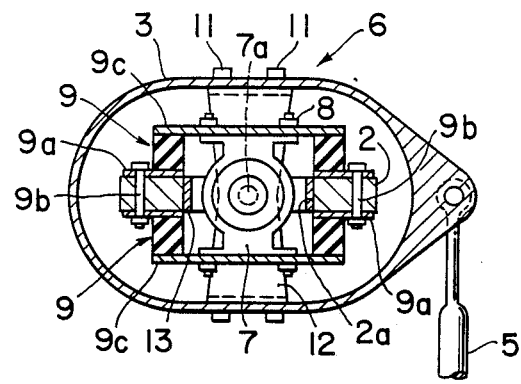
FIGS. 2A and 2B are sectional views taken along the line IIA—IIA and IIB—IIB shown in FIG. 1, respectively.
Figure 2B:
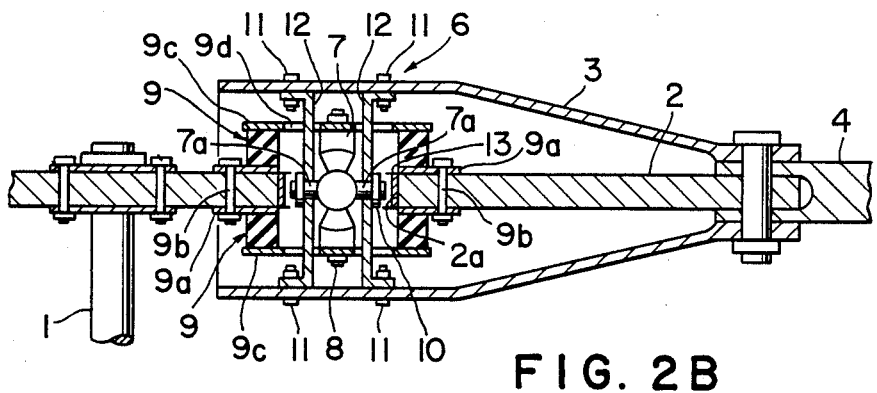

Referring first to FIG. 2B, there is provided a rotatable central mast 1 to which four flexible beams or flexbeams 2 are secured at their inboard ends. As shown in FIG. 1, these flexbeams 2 extend radially in cruciform fashion and are accommodated in pitch sleeves 3, respectively. The outboard end of each of the pitch sleeves 3 is coupled with the inboard end of a rotor blade 4, and, as shown in FIG. 2A, a pitch change link 5 for changing the pitch of the rotor blade 4 is connected to one side of the pitch sleeve 3. The pitch changing operation is performed by vertical movement of the pitch change link 5.

A damping device 6 is mounted at the inboard end of each pitch sleeve 3, the damping device 6 being adapted to change the pitch of the rotor blade 4 and damp the lead-lag motion thereof and being loosely fitted through a hole 2a formed in the flexbeam 2.

As shown in FIGS. 2A and 2B, the damping device 6 comprises an elastomeric pivot 7 having a pair of central opposite shafts 7a, elastomeric dampers 9 and at least one (two in the illustrated embodiment) substantially vertical torque arm 12, which is a planar plate in this embodiment. The elastomeric pivot 7 together with the shafts 7a is formed of elastomers and shims which are alternatingly laminated in known manner and is rotatable and swingable owing to the shearing deformation of the elastomers. The elastomeric dampers 9 are each of substantially cylindrical construction and are disposed on the upper and lower surfaces of the flexbeam 2, so as to surround the outer peripheries of upper and lower extensions, as viewed, of the elastomeric pivot 7. Each elastomeric damper 9 has a mounting flange 9a made of metal, which flange 9a is fixedly secured to the flexbeam 2 by means of fastening bolts 9b. Each elastomeric damper 9 further has a metal fastening plate 9c on the opposite side of the mounting flange 9a. The fastening plate 9c has openings 9d as shown in FIG. 1. The upper and lower extensions of the elastomeric pivot 7 are fixed to the fastening plates 9c, respectively, by means of nuts 8 engaging screw studs projecting from the upper and lower extensions of the elastomeric pivot 7. The elastomeric dampers 9 can provide a damping function by utilizing the viscoelasticity (i.e. energy absorbing characteristic due to internal friction on the basis of the deformation of molecular structure) of the elastomer.

The torque arms 12 are disposed on opposite sides of the elastomeric pivot 7 and coupled at their central portions between the upper and lower ends with the central shafts 7a of the elastomeric pivot 7 through nuts 10 so as to extend through the elastomeric dampers 9 and the flexbeam 2. The torque arms 12 are also coupled at their upper and lower ends with the pitch sleeve 3 via bolts and nuts 11. Bushings 13 acting as stoppers or abutments are fitted to the through holes 2a formed at the inboard ends of the respective flexbeams 2.

The assembling of each of the pitch change and lead-lag motion damping devices 6 is performed in accordance with the following procedure. The through hole 2a is first formed through the inboard end of the flexbeam 2, and the bushing 13 is then fitted into the through hole 2a in contact with the inner periphery thereof. An assembly of the elastomeric pivot 7 and the torque arms 12, which are coupled to the pivot 7 by means of the nuts 10, is then fitted into the bushing 13. The elastomeric dampers 9 are thereafter mounted around the assembly from the upper and lower ends of the torque arms 12, and the elastomeric dampers 9 are then fixed to the elastomeric pivot 7 by means of nuts 8 and to the flexbeam 2 by means of the bolts 9b. The pitch sleeve 3 and the torque arms 12 are fastened by means of the nuts 11 after the pitch sleeve 3 has been mounted over the flexbeam 2.

According to the feature described above with respect to one rotor blade 4, the elastomeric dampers 9 and the torque arms 12 are fixed to the flexbeam 2 and the pitch sleeve 3 respectively, and the elastomeric pivot 7 is coupled with the elastomeric dampers 9 and the torque arms 12, while the elastomeric dampers 9 are mechanically but indirectly coupled with the pitch sleeve 3, whereby the relative positional relationship between the elastomeric pivot 7 and the pitch sleeve 3 is not changed.

Figure 3:
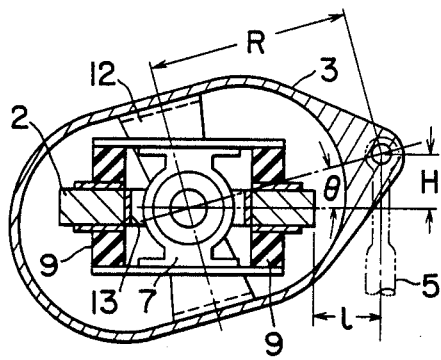
FIG. 3 is a view, similar to FIG. 2A, showing one state of the pitch change of the rotor blade.
Figure 4:
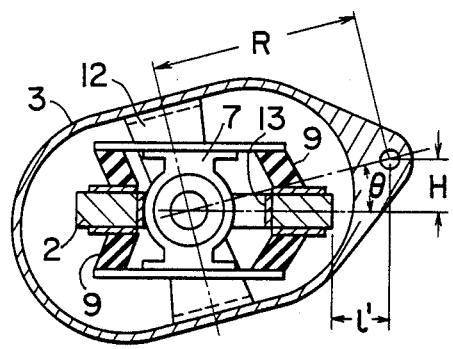
FIG. 4 is a view, similar to FIG. 2A, showing another state of the pitch change and lead-lag motion damping of the rotor blade.

As shown in FIGS. 3 and 4, in a case where the lead-lag motion is imparted to the rotor blade 4 and hence the distance l (FIG. 3) between the end surface of the flexbeam 2 and the pitch change link 5 varies to the distance l' (FIG. 4) (lead-lag momentum $\delta = l - l'$), resulting in the change of the relative positional relationship between the flexbeam 2 and the pitch sleeve 3, the change of the relative positional relationship between the pitch sleeve 3 and the elastomeric pivot 7 can be effectively prevented, whereby the pitch change radius R and the blade pitch angle $\theta$ can be always maintained constant.

The bushing 13 inserted into the through hole 2a acts to restrict the amount of deformation of the elastomeric pivot 7. Namely, when the lead-lag motion of the rotor blade reaches a predetermined amount, the amount of deformation of the elastomeric pivot can be restricted so as to prevent overload on the elastomeric pivot, by fitting the elastomeric pivot in the bushing acting as a stopper or abutment fitted into the through hole of the flexbeam.

What is claimed is:

1. A system for damping lead-lag motion of rotor blades of a helicopter, which comprises a central mast rotated by a power source, at least two flexbeams each connected with the central mast at an inboard portion thereof to rotate about the rotational axis of the central mast and secured to one of the rotor blades at an outboard end thereof, pitch sleeve means secured at one end thereof to the rotor blade to enclose each of the flexbeams, said pitch sleeve means having a substantially elliptical cross section, pitch change means for changing the pitch of the rotor blades by moving the pitch sleeve means, and damping means for damping the lead-lag motion of the rotor blades, wherein the damping means comprises:

at least one torque arm coupled with the pitch sleeve means at upper and lower sides of the pitch sleeve means;

an elastomeric pivot having at least one central shaft supported by the torque arm, said elastomeric pivot also having upper and lower extensions; and elastomeric dampers mounted on upper and lower surfaces of each of the flexbeams at one end portions thereof and fastened to the upper and lower extensions of the elastomeric pivot at the other end portions thereof, respectively, to damp the lead-lag motion of the rotor blade so as to prevent changing of relative positional relationship between the pitch sleeve means and the elastomeric pivot even when change of relative positional relationship occurs between the flexbeam and the pitch sleeve means by the operation of the pitch change means.

2. The system according to claim 1 wherein said flexbeam comprises a through hole formed at the inboard end thereof for loosely fitting the elastomeric pivot, and a bushing fitted in the through hole for restricting movement of the elastomeric pivot within the through hole so as to prevent overload on the elastomeric pivot.

3. The system according to claim 1 wherein the central shaft is fixed to the central portion of the torque arm.

4. The system according to claim 1 wherein the torque arm extends through an opening formed in a fastening plate of the elastomeric dampers.

5. The system according to claim 4 wherein the torque arm is a planar plate.

6. The system according to claim 1 wherein each of the elastomeric dampers has a mounting flange attached to the flexbeam.

* * * * *